United States Patent
Silva

(10) Patent No.: US 11,562,503 B2
(45) Date of Patent: Jan. 24, 2023

(54) ONLINE EVALUATION FOR CAMERA INTRINSIC PARAMETERS

(71) Applicant: Continental Automotive GmbH, Hannover (DE)

(72) Inventor: Carlos Silva, Eastbourne (GB)

(73) Assignee: Continental Automotive GmbH

(*) Notice: Subject to any disclaimer, the term of this patent is extended or adjusted under 35 U.S.C. 154(b) by 95 days.

(21) Appl. No.: 17/050,532

(22) PCT Filed: Apr. 15, 2019

(86) PCT No.: PCT/EP2019/059690
§ 371 (c)(1),
(2) Date: Oct. 26, 2020

(87) PCT Pub. No.: WO2019/206723
PCT Pub. Date: Oct. 31, 2019

(65) Prior Publication Data
US 2021/0233274 A1    Jul. 29, 2021

(30) Foreign Application Priority Data

Apr. 26, 2018 (EP) .................................. 18169389

(51) Int. Cl.
*G06T 7/80* (2017.01)
*G06T 7/181* (2017.01)
(Continued)

(52) U.S. Cl.
CPC ............... *G06T 7/80* (2017.01); *G06T 7/13* (2017.01); *G06T 7/181* (2017.01); *B60R 11/04* (2013.01);
(Continued)

(58) Field of Classification Search
None
See application file for complete search history.

(56) References Cited

U.S. PATENT DOCUMENTS 7,768,534 B2* 8/2010 Pentenrieder ......... G06T 19/006
345/619
9,438,897 B2* 9/2016 Barreto ................ H04N 17/002
(Continued)

FOREIGN PATENT DOCUMENTS

EP    2 600 308    6/2013

OTHER PUBLICATIONS

International Search Report of the International Searching Authority for International Application PCT/EP2019/059690, dated May 20, 2019, 2 pages, European Patent Office, HV Rijswijk, Netherlands.
(Continued)

*Primary Examiner* — Tyler W. Sullivan
(74) *Attorney, Agent, or Firm* — RatnerPrestia

(57) ABSTRACT

The invention relates to a camera system (1) for a vehicle (2). The camera system (1) is configured to acquire image data of a surrounding of the vehicle (2) and comprises a camera (10) and a control module (20). The control module (20) is configured to determine, whether a calibration of an intrinsic parameter of the camera system (1) is required, by determining an error in a back projection, a forward projection and/or a reprojection of the image data and by determining whether the error exceeds a predefined threshold.

7 Claims, 4 Drawing Sheets

(51) Int. Cl.
*G06T 7/13* (2017.01)
*B60R 11/04* (2006.01)
*B60R 11/00* (2006.01)

(52) U.S. Cl.
CPC ............. *B60R 2011/0026* (2013.01); *G06T 2207/30248* (2013.01)

(56) References Cited

U.S. PATENT DOCUMENTS

| | | | | |
|---|---|---|---|---|
| 10,083,376 | B2* | 9/2018 | Kolavennu | H04N 7/18 |
| 11,288,412 | B2* | 3/2022 | Golparvar-Fard | G06F 30/13 |
| 2002/0186897 | A1* | 12/2002 | Kim | G06T 7/80 |
| | | | | 382/154 |
| 2010/0214412 | A1* | 8/2010 | Ehlgen | G06V 20/56 |
| | | | | 348/148 |
| 2012/0287232 | A1* | 11/2012 | Natroshvili | G06T 7/33 |
| | | | | 348/36 |
| 2013/0135463 | A1* | 5/2013 | Aratani | G06V 10/56 |
| | | | | 348/135 |
| 2017/0186164 | A1* | 6/2017 | Seetharaman | G06V 20/647 |
| 2019/0096091 | A1* | 3/2019 | Bao | G06T 7/11 |
| 2019/0155302 | A1* | 5/2019 | Lukierski | G06T 7/73 |
| 2020/0226789 | A1* | 7/2020 | Ma | G06T 7/80 |

OTHER PUBLICATIONS

PCT Written Opinion of the International Searching Authority for International Application PCT/EP2019/059690, dated May 20, 2019, 9 pages, European Patent Office, Munich, Germany.

Extended European Search Report and Examination Report for European Patent Application No. 18169389.6, dated Jul. 9, 2018, 10 pages, European Patent Office, Munich, Germany.

Xianghua Ying et al., "Fisheye Lenses Calibration Using Straight-Line Spherical Perspective Projection Constraint", Jan. 1, 2005, Computer Vision—ACCV 2006 Lecture Notes in Computer Science, LNCS, Springer, Berlin, ISBN: 978-3-540-31244-4, pp. 61 to 70.

Feifei Gu et al., "Camera Calibration Based on the Back Projection Process", Measurement Science and Technology, IOP, Bristol, GB, vol. 26, No. 12, Oct. 26, 2015, p. 125004, XP020292757, ISSN: 0957-0233, 10 pages.

Nicolaj C. Stache et al., "Robust Circle Fitting in Industrial Vision for Process Control of Laser Welding Robust Circle Fitting in Industrial Vision for Process Control of Laser Welding", In: "Proceedings of the 11th International Student Conference on Electrical Engineering Poster 2007", May 1, 2007, XP055488456, vol. 17, 8 pages.

Luis Puig et al., "Calibration of Omnidirectional Cameras in Practice: A Comparison of Methods", Computer Vision and Image Understanding, Academic Press, US, vol. 116, No. 1, Aug. 26, 2011, XP028112807, ISSN: 1077-3142, pp. 120 to 137.

* cited by examiner

Raw Image

Camera ray

Raw Image

ONLINE EVALUATION FOR CAMERA INTRINSIC PARAMETERS

The invention relates to a camera system for a vehicle, a vehicle comprising the camera system, a method for evaluating intrinsic parameters of a camera, a program element, and a computer-readable medium.

In a modern vehicle a plurality of sensors are installed or mounted onto the vehicle to support a driver of the vehicle during driving. To achieve a proper functionality of the sensors, these may be calibrated. The calibration includes intrinsic parameters and extrinsic parameters of the sensor, for example a camera. Typically, intrinsic parameters are not recalibrated or are recalibrated in constant time or operational intervals. Further, the recalibration may need significant computational power and/or time.

It may be an object to provide an efficient camera calibration.

The object of the present invention is solved with the subject matter of the independent claims, wherein further embodiments are incorporated in the dependent claims.

A first aspect provides a camera system for a vehicle. The camera system is configured to acquire image data of a surrounding of the vehicle and comprises a camera and a control module. The control module is configured to determine, whether a calibration of an intrinsic parameter of the camera system is required, by determining an error in a back projection, a forward projection and/or a reprojection of the image data and by determining whether the error exceeds a predefined threshold.

The projection between a camera ray and a raw image may be executed using the intrinsic parameters of the camera and vice versa. Thus, not valid or inaccurate intrinsic parameters would lead to an incorrect projection between the camera ray and the raw image or vice versa.

The invention relies on the principle that a, in reality, straight line in the scene is projected into the unit circle on the surface of the unit sphere and is projected into a curve in the raw image.

The camera system may comprise a camera and a control module. The control module may be configured to evaluate whether the actual intrinsic parameters of the camera are still valid and accurate. Therefore, the control module analyses at least one of a back projection, a forward projection and/or a reprojection. Further, the control module may calculate the error in each one of this projections and if the error exceeds a predefined threshold, a recalibration of the intrinsic parameters is required, which may be optionally triggered. The control module may perform the recalibration online. Thus, directly during the operation of the camera system or the control module may initiate a service stop for performing the recalibration. Thus, the recalibration of the camera may be performed when required, which reduced computational power or time as well as service time of the camera system.

There is a variety of methods that may be used to detect lines in the raw image. The points of these lines may be denoted as edge points. The control module may use lines, which are detected and used by other function of the camera system or the vehicle. Therefore, the computation load may be further reduced.

Furthermore, through the determined edge points a circle and/or a conic curve may be fitted (depending on camera ray or raw image), since a straight line (in reality) should appear as circle in the unit sphere and as conic curve in the raw image. For a more accurate result, inlier points (a subset of the edge points) to the edge points may be determined and used for fitting the circle and/or the conic curve.

The error in each projection, thus, the evaluation and validation of the intrinsic parameters, may be measured by the error from a fitting function, both in the raw image and in the unit sphere.

The intrinsic parameters of the camera may be a focal length, a x-value of the image centre, a y-value of the image centre, a pixel scaling in x direction and a pixel scaling in y-direction, all of which are defined in Cartesian coordinates.

The back projection may be defined as the projective transformation from raw image into the unit sphere. The edge points that are inlier points to the conic curve, which may be fitted in raw image, may be selected. The distance from the edge points to the circle defined in unit sphere may be measured. The root mean square of this distance may be representative to the back projection error.

Forward projection may be defined as the projective transformation from the unit sphere into the raw image. The edge points that are inlier points to the circle, which may be fitted in the unit sphere, may be selected. The index of the determined inlier points may be used to identify the corresponding points in the raw image. The distance from the edge points to the curve in raw image may be measured. The root mean square of this distance may be representative to the forward projection error.

The reprojection may be defined as a combination of the back projection and forward projection. Edge points and inlier points in the raw image may be projected into the unit sphere and may be projected back into the raw image. The reprojection error may be the root mean square of the distance between the reprojected points and the fitted conic curve (through the inlier points) in raw image.

According to an embodiment, the camera is a fisheye camera.

The camera of the camera system may be comprise a fisheye lens. The distortion in cameras using fisheye lenses may be significant and therefore, the intrinsic parameters should be accurate, such that a correct analysis, such as measuring distances within the acquired image data or the recognition of objects, of the image data may be possible. In particular, if the acquired image data is used for automated and/or automatically driving functions.

According to another embodiment, the camera is configured to acquire a raw image. Further, the control module is configured to determine edge points in the raw image.

The control module may be configured to determine in reality straight lines, which are represented as curves in the raw image, acquired by the camera. The straight lines in reality or the scene may be pillars, walls, ceilings and/or markings. These types of objects comprise usually straight lines, such that a recognition algorithm may detect these objects and determine the straight lines in the acquired image. The determined edge points may serve as starting basis for the evaluation of the intrinsic parameters of the camera. The detection of edges may, for example, be performed by a canny edge detector.

According to an embodiment, the control module is configured to project the raw image, including the edge points, to a camera ray by using the intrinsic parameters of the camera. The camera ray comprises a unit sphere with radius 1, wherein lines in reality are represented as part of a circle on the surface of the unit sphere. The control module is further configured to fit a circle through the edge points in the camera ray.

The next step may be to project the detected or determined edge points into the unit sphere using the intrinsic projection. The straight line in the scene will be a part of a circle on the surface of the unit sphere. Line fitting in unit sphere may be according to this formula:

$$\hat{r}*l=0, \text{ with } l=[a\ b\ c]=[\sin\theta\cos\varphi\ \cos\theta\cos\varphi\ \sin\varphi]$$

According to an embodiment, the control module is configured to determine inlier points of the fitted circle in the camera ray, wherein the inlier points are part of the determined edge points.

The inlier points may be determined in the camera ray by fitting a circle through the edge points, which may be determined in the raw image and projected into the camera ray. The inlier points may be edge points, which have a lower scatter as the residual edge points. Thus, the inlier points may be determined by the derivation of the edge points.

According to another embodiment, the control module is configured to fit a conic curve through the inlier points in the raw image.

The determined inlier points may be used to fit a conic curve there through. Further, also the index of the inlier points may be used to identify the corresponding edge points in the raw image. Thus, a projection of the inlier points of the camera ray into the raw image may be not required.

According to an embodiment, the control module is configured to use a conic fitting algorithm to fit the conic curve through the inlier points in the raw image.

The straight line in reality corresponds to a conic curve in the raw image. The latter is based on distortion in the camera system, for example in the lens of the camera. In particular, if the lens is a fisheye lens. Further, to fit a conic curve through the determined inlier points, a conic fitting algorithm may be used.

The straight line in the scene corresponds to the conic curve in the raw image. The conic curve may be represented by the formula:

$$x^T C x = 0$$

Fitzgibbon direct least squares fitting of ellipses is represented by:

$$ax^2+bxy+cy^2+dx+ey+f=0, \text{ with a constraint for ellipse of } 4ac-b^2=1$$

Thus, the conic curve may be represented by:

$$C = \begin{bmatrix} a & \frac{b}{2} & \frac{d}{2} \\ \frac{b}{2} & c & \frac{e}{2} \\ \frac{d}{2} & \frac{e}{2} & f \end{bmatrix}$$

According to another embodiment, the fitting algorithm may be a Fitzgibbon conic fitting algorithm.

According to another embodiment, the control module is configured to determine the error between the edge points and the fitted conic curve in the raw image.

The error or the distance between the edge points and the fitted conic curve may be equivalent with the accuracy of the actual intrinsic parameters of the camera and/or the recent calibration of the camera system. Thus, the bigger the error or the average distance between the fitted conic curve and the sole edge points, the more inaccurate the intrinsic parameters are. For a reliable evaluation or analysis of the acquired images, the intrinsic parameters of the used camera need to be actual and accurate. Thus, over time a recalibration of the intrinsic parameters of the camera may be required. However, to reduce computing power and time, the recalibration should be only performed if required. Therefore, the error in one of the back projection, the forward projection and/or the reprojection may be analysed.

According to an embodiment, the control module is configured to determine the error between the edge points and the fitted conic curve in the raw image by means of the root means square method.

As an example, the error or the distance between the edge points and the fitted conic curve may be determined by the roots means square method.

According to an embodiment, the control unit is configured to trigger a calibration of the intrinsic parameter if the predefined threshold is exceeded.

Thus, to ensure a correctly working camera system the intrinsic parameters may be recalibrated, if the determined error between the conic curve and the edge points exceeds a certain threshold. The calibration may be performed online. Thus, during driving via the control module or during a service stop in a workshop. The before and hereinafter described method especially treats the evaluation of the accuracy of the recent calibration.

According to another aspect of the invention, a vehicle comprising a driver assistance system for determining the extra off-duty time intervals is provided.

The vehicle may, for example, be a motor vehicle, such as a car, bus or truck, but also a ship, a boat, an aircraft or a helicopter.

According to yet another aspect a method for evaluating intrinsic parameters of a camera is provided. The method comprises the following steps:
  acquiring, by a camera, a raw image;
  determining edge points in the raw image;
  projecting the edge points to a camera ray, wherein the camera ray comprises a unit sphere with radius 1, wherein lines in reality are projected as part of a circle on the surface of the unit sphere;
  fitting a circle through the edge points in the camera ray;
  determining inlier points of the fitted circle in the camera ray,
  wherein the inlier points are part of the determined edge points;
  projecting the inlier points to the raw image;
  fitting a conic curve trough the inlier points in the raw image;
  determining the error between the edge points and the conic curve in the raw image;
  comparing the determined error to a predefined threshold and if the threshold is exceeded, triggering a calibration of the intrinsic parameter of the camera.

It should be noted, that the method might be performed in another sequence. Further, the error may be determined in the camera ray. Furthermore, also the index of the inlier points may be determined and used to identify the corresponding points in the raw image or the camera ray. Thus, a back projection of the inlier points may be avoided.

According to another aspect, there is provided a computer program element controlling apparatus as previously described which, in the computer program element is executed by processing unit, is adapted to perform the method steps as previously described.

There is also provided a computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

Exemplary embodiments will be described in the following with reference to the following drawings.

Figure 1:
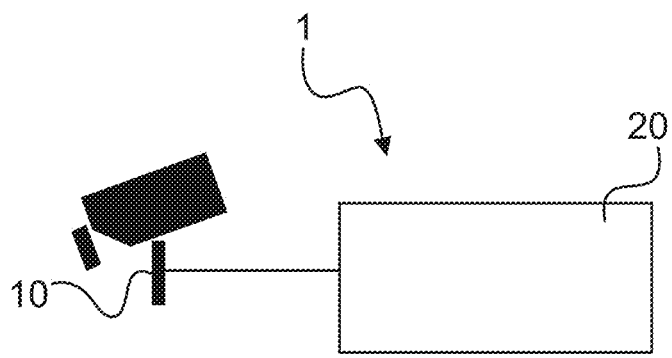
FIG. 1 shows a schematic view of a camera system for a vehicle according to an embodiment.

FIG. 1 shows a camera system 1. The camera system 1 comprises a camera 10 and a control module 20. The control module 20 may be configured to determine if a recalibration of intrinsic parameters of the camera system 1 is required. Therefore, the control module 20 may be configured to determine an error in a back projection, a forward projection and/or a reprojection of the acquired image data. The latter projections are executed by the aid of the intrinsic parameters of the camera. In particular, the control module 20 may be configured to compare the error in the back projection, the forward projection and/or the reprojection to a predefined threshold and if the error exceed the threshold, a recalibration of the intrinsic parameters of the camera 10 may be triggered. This method may be in particular useful for a camera with a fisheye lens.

The camera 10 acquires a raw image of a real environment or scene. Due to distortion, generated by the lens of the camera 10, straight lines in reality appear as curved lines in the raw image. The control module 20 may be configured to determine edge points in the raw image, which are part of edges, such as walls, trees, spires, markings, signs or doors, in the raw image. Alternatively or in addition, these edge points may be determined by another module or algorithm. The control module 10 may be further configured to project the raw image, including the determined edge points, to the camera ray by using the intrinsic parameters. The camera ray comprises a unit sphere with the radius one, wherein straight lines in reality are represented as part of a circle on the surface of the unit sphere. The control module 20 may also be configured to fit a circle on the surface of the unit sphere through the edge points in the camera ray. Subsequently, the control module 20 may determine inlier points, which are a subset or part of the edge points. Further, the control module 20 may be configured to fit a conic curve through the inlier points in the raw image, by the use of a conic fitting algorithm like the Fitzgibbon conic fitting algorithm. Based on the error and/or the distance between the edge points and the conic curve, the control module 20 is able to determine if the calibration of the intrinsic parameters of the camera is still valid or not. In particular, by comparing the determined error with a predefined threshold. Alternatively or in addition, an index of the inlier points may be determined and used to calculate a conic curve and determine the error. The error may be determined by using the roots means square method. The control module 20 may be further configured to trigger a recalibration of the intrinsic parameters of the camera 10, if the error exceed the predefined threshold.

Figure 2:
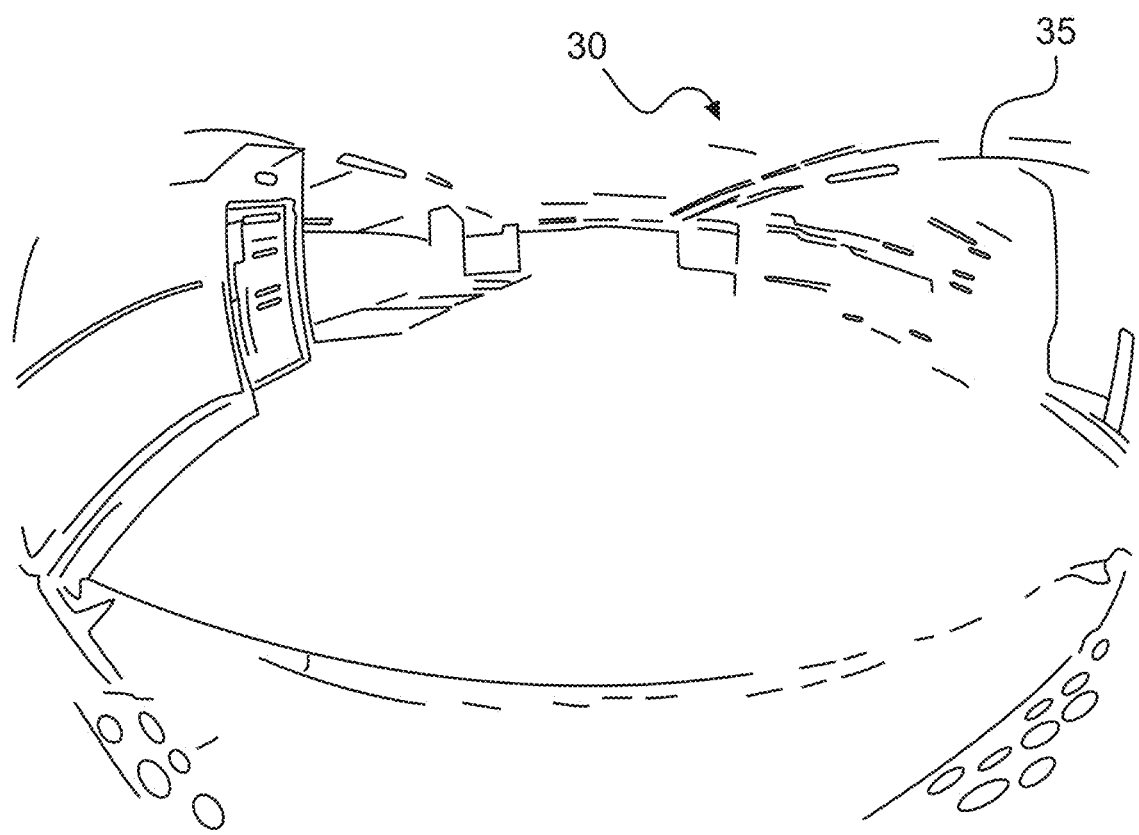
FIG. 2 shows an acquired raw image of the camera system with detected edges therein, according to an embodiment.

FIG. 2 shows an acquired raw image 30. In the acquired raw image 30, the edges of the acquired scene are detected. These detected edges are illustrated by differently shaded and shaped conic curves, since a straight line 35 in reality is represented in the raw image 30 as a conic curve. In the case of FIG. 2, a parking garage is shown, pillars and the ceiling as well as road markings are straight lines 35 in the scene and there may be use to evaluate the intrinsic parameters of the camera.

Figure 3:
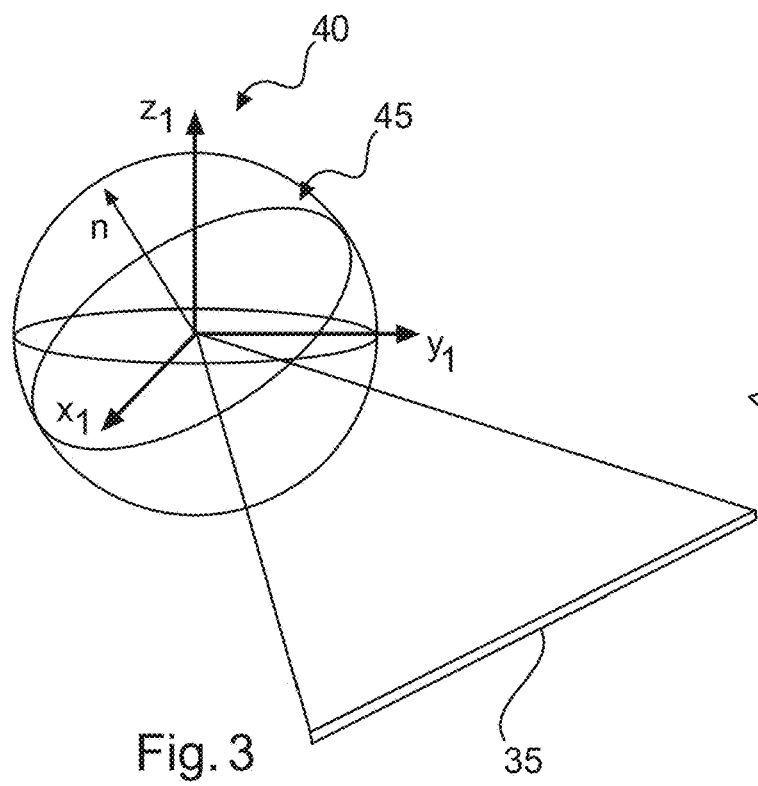
FIG. 3 shows a unit sphere with a straight line projected onto a circle on the surface of the unit sphere, according to an embodiment.

FIG. 3 shows the unit sphere 45 of the camera ray 40. The radius n of the unit sphere 45 is one. The straight line 35 in the reality is projected onto the surface of the unit sphere 45, and represents a part of a circle on the surface of the unit sphere 45. Thus, straight lines 35 appear as part of a circle in the camera ray 40.

Figure 4:
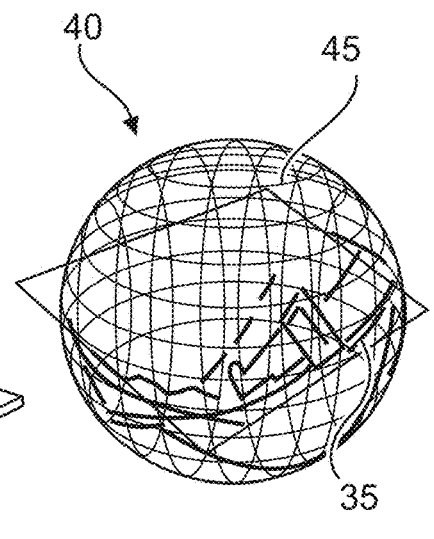
FIG. 4 shows an acquired image in the camera ray, wherein straight lines are projected onto circles on the surface of the unit sphere, according to an embodiment.

FIG. 4 shows the camera ray 40, in which the raw image of FIG. 2 is transformed into the camera ray 40 and projected onto the surface of the unit sphere 45 in the camera ray 40. The marked straight line 35 of FIG. 2 is represented as a part of a circle in the camera ray 40, as well as the other straight lines of the raw image.

Figure 5:
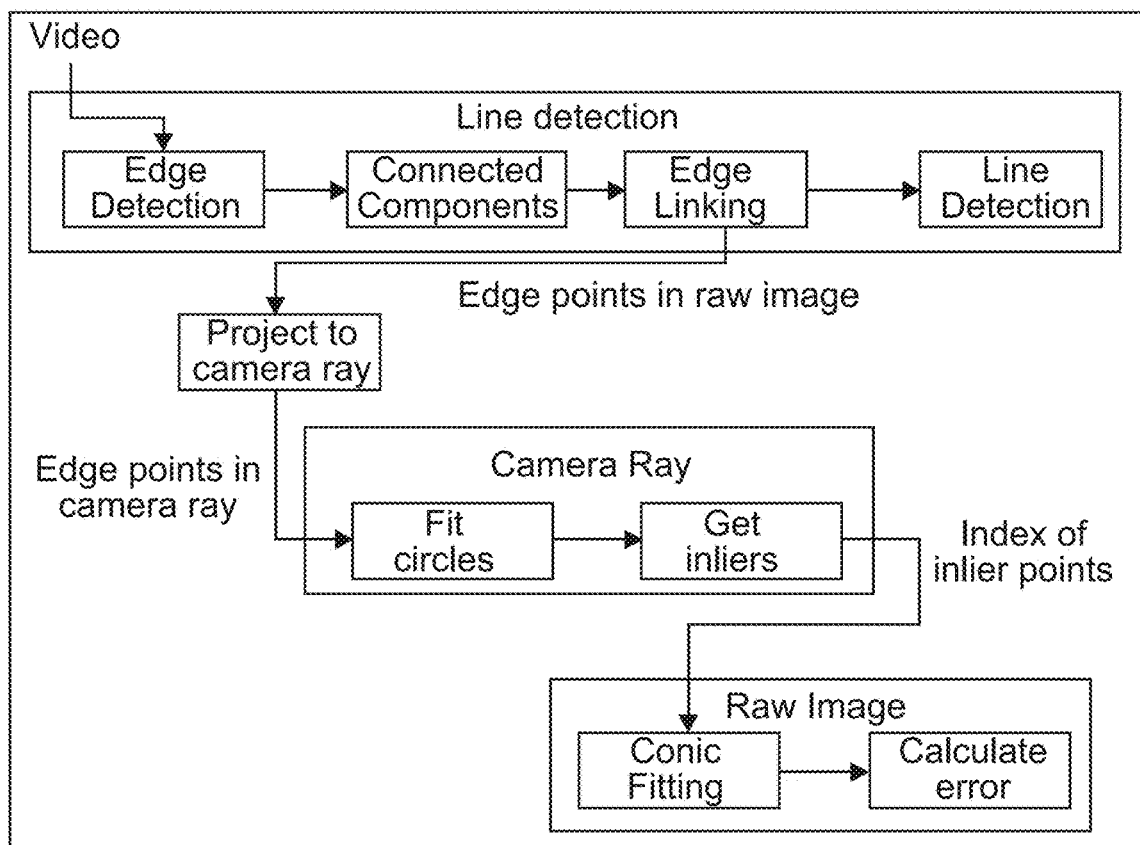
FIG. 5 shows a flow chart for evaluating intrinsic parameters of a camera, according to an embodiment.

FIG. 5 shows a flow diagram of the method for evaluating intrinsic parameters of a camera. In an acquired image or video edges, which correspond to straight lines are detected. The edge points of the raw image are projected into the camera ray. In the camera ray, the edge points are on a circle on the surface of the unit sphere. Inlier points may be determined after the circle is fitted through the edge points. With this inlier points, a conic curve may be fitted, calculated or determined in the raw image. Therefore, the inlier points may be projected back into the raw image or the index of the inlier points is determined and the index of the inlier points is used to identify the corresponding edge points in the raw image. Further, an error may be determined between the fitted conic curve and the edge points. If the error exceeds a predefined threshold, the intrinsic parameters of the camera are not valid or accurate anymore and the intrinsic parameters of the camera need to be recalibrated.

FIGS. 6a to 6d shows the detected edge points, the determined inlier points, the fitting of the conic curve and the determination of the error.

Figure 6A:
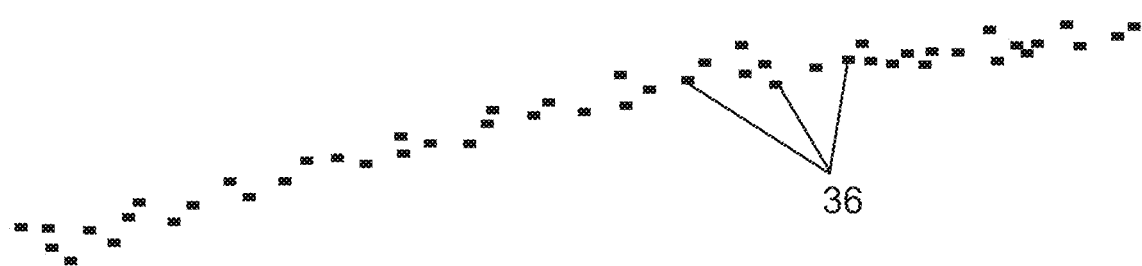
FIG. 6a-6d shows detected edge points, determined inlier points to the edge points, the fitted conic curve and the error between the fitted curve and the edge points, according to an embodiment.

The points in FIG. 6a represent edge points 36 of a straight line in the scene (in reality) in the raw image. As shown in FIG. 6a, the edge points are not exactly on one curve, this may result by the use of the edge detection algorithm and of the pixel size in the acquired image. Further, the edge points 36 scatter around a middle value and it is shown, that some edge points scatter more than others.

Figure 6B:
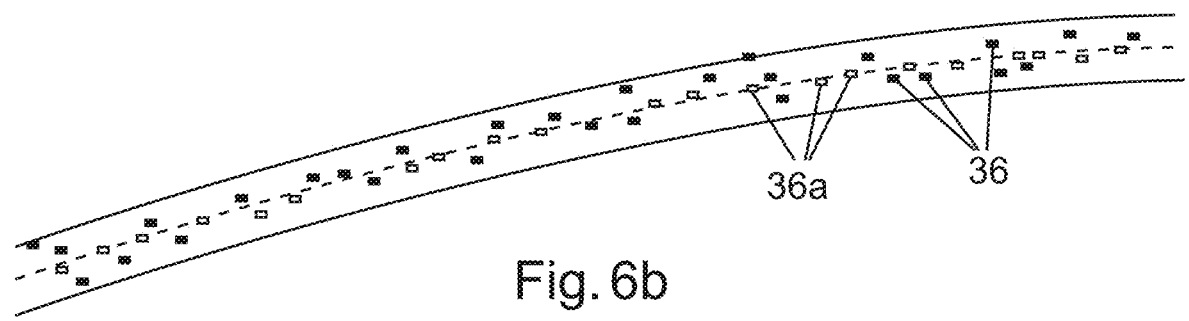

FIG. 6b shows the definition of the inlier points 36a, these points are between the "outer" edge points 36. In FIG. 6b, the edge points 36 are represented as dark dots and the inlier points 36a as grey dots. Further, an upper barrier and a lower barrier are represented in FIG. 6b, which are represented as black lines. The dotted line represents the curve on which the inlier points 36a are located.

Figure 6C:
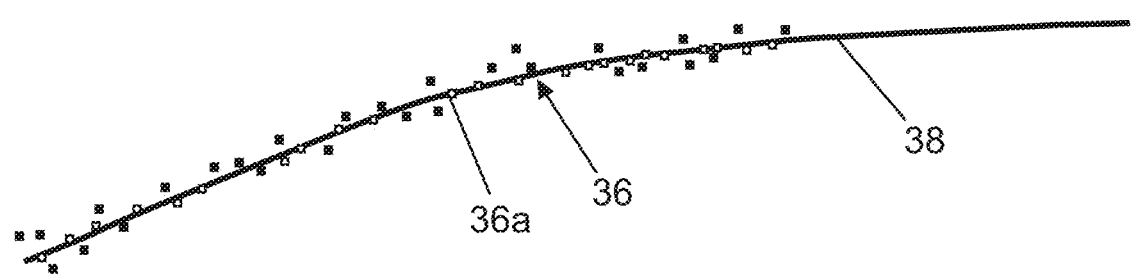

FIG. 6c shows the fitted conic curve 38, which is calculated based on and/or fitted through the inlier points 36a. Further, it is shown, that the inlier points 36a are located on the conic curve 38.

Figure 6D:
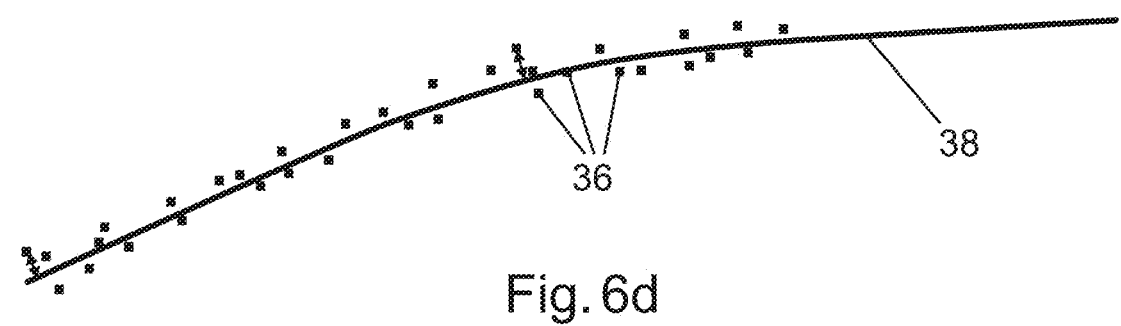

FIG. 6d shows the fitted conic curve 38 and the edge points 36. The distance between the conic curve 38 and the edge points 36 represents the error in the back projection between the camera ray and the raw image. The arrows between the edge points 36 and the conic curve 38 illustrate the error. If the error exceeds a predefined threshold, the intrinsic parameters of the camera are not valid anymore and need to be recalibrated.

Figure 7:
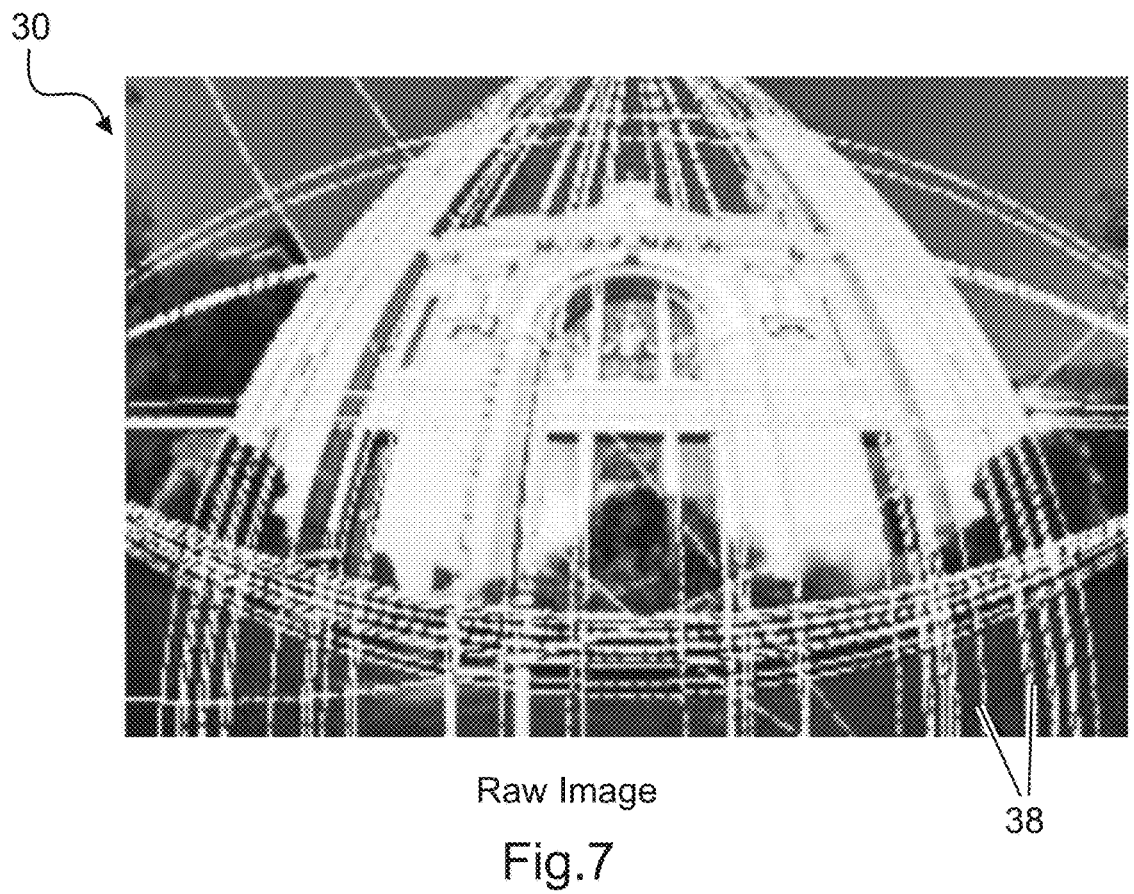
FIG. 7 shows an acquired raw image with fitted conic curves through the edge points therein, according to an embodiment.

FIG. 7 shows a raw image 30 with a plurality of fitted conic curves 38. The fitted conic curves 38 are fitted through the inlier points of the edge points of straight lines in the scene. In FIG. 7, a raw image of a church is shown. The spires of the church as well as the door comprises multiple straight lines and/or edges. Points of these lines and/or edges may be determined in the raw image 30 and a conic curve 38 may be fitted through the determines edge points. The error between the edge points and the fitted conic curve 38 provide information over the intrinsic parameters and their accuracy. For determining the error between the conic curve 38 and the edge points, the root means square may be taken into account. If the error exceed a predefined threshold, the intrinsic parameters of the camera may be recalibrated.

Figure 8:
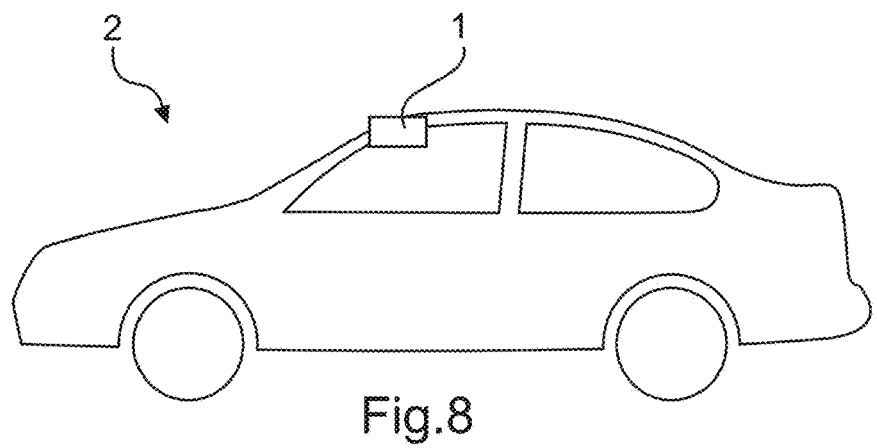
FIG. 8 shows a vehicle with the camera system according to an embodiment.

FIG. 8 shows a vehicle 2 with a camera system 1. The camera of the camera system 1 may be mounted behind the windscreen of the vehicle 2 facing the driving direction of the vehicle 2. Alternatively or in addition, the camera of the camera system 1 may be arranged at a side of the vehicle 2, the side mirrors or the tail end of the vehicle 2, facing the area behind the vehicle 2. The camera and the control module of the camera system 1 may be arranged at the same location within the vehicle 2, but also spaced apart, being connected over a bus system or a wire.

Figure 9:
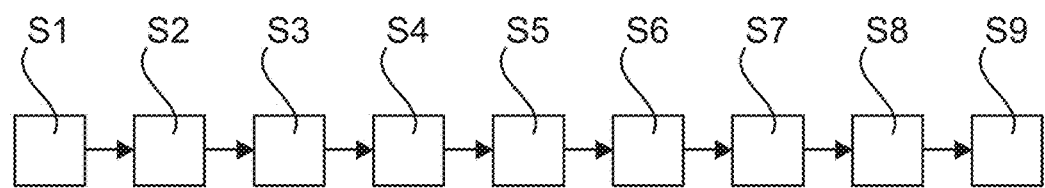
FIG. 9 shows a flow chart of a method for evaluating intrinsic parameters of a camera, according to an embodiment.

FIG. 9 shows a flow diagram of a method for evaluating intrinsic parameters of a camera. In step S1, a camera acquires a raw image, wherein the camera may comprise a fisheye lens. In step S2, edge points of edges are determined in the acquired raw image. In step S3, the determined edge points are projected to the camera ray, wherein the camera ray comprises a unit sphere with radius 1 and wherein straight lines in reality are projected as parts of a circle on the surface of the unit sphere. Subsequently, in step S4, a circle is fitted through the edge points in the camera ray. In step S5, inlier points of the edges points are determined with the aid of the fitted circle in the camera ray. In step SG, the inlier points are projected to the raw image. In step S7, a conic curve is fitted through the inlier points in the raw image. Followed by step S8, in which the error between the edge points and the conic curve is determined in the raw image. In step S9, the determined error is compared to a predefined threshold and if the threshold exceeds the predefined threshold, a calibration of the intrinsic parameters of the camera is triggered.

The invention claimed is:

1. A camera system for a vehicle, comprising:
   a camera configured to acquire image data of a surrounding of the vehicle; and
   a processor configured to:
      determine that a calibration of an intrinsic parameter of the camera system is required, by performing a reprojection including:
         1) projecting edge points in the image data to edge points on a unit sphere,
         2) fitting a circle through the edge points on the unit sphere,
         3) determining inlier points of the edge points on the unit sphere from the fitted circle, the inlier points being a subset of the edge points that are within a predetermined distance from the fitted circle,
         4) projecting the inlier points on the unit sphere back to the image data as a conic curve, and
         5) determining that an error in the reprojection determined as a distance from the edge points to the conic curve in the image data exceeds an error threshold, and
      perform the calibration of an intrinsic parameter of the camera system when the calibration is determined to be required.

2. The camera system according to claim 1, wherein the camera is a fisheye camera.

3. The camera system according to claim 1, wherein the processor is configured to use a conic fitting algorithm to fit the conic curve through the inlier points in a raw image.

4. The camera system according to claim 1, wherein the processor is configured to determine the error between the edge points and the fitted conic curve in a raw image by the root means square method.

5. A vehicle comprising the camera system according to claim 1.

6. A method for evaluating intrinsic parameters of a camera, comprising:
   acquiring, by a camera, image data of a surrounding of the vehicle;
   determining, by a processor, edge points in the image data;
   determining, by the processor, that a calibration of an intrinsic parameter of the camera is required, by performing a reprojection including:
      1) projected edge points to edge points on a unit sphere,
      2) fitting a circle through the edge points on the unit sphere,
      3) determining inlier points of the edge points on the unit sphere from the fitted circle, the inlier points being a subset of the edge points that are within a predetermined distance from the fitted circle,
      4) projecting the inlier points on the unit sphere back to the image data as a conic curve, and
      5) determining that an error in the reprojection determined as a distance from the edge points to the conic curve in the image data exceeds an error threshold, and
   performing, by the processor, the calibration of an intrinsic parameter of the camera when the calibration is determined to be required.

7. A non-transitory computer readable medium having stored thereon a computer program that when executed by a processor performs the method according to claim 6.

* * * * *